United States Patent [19]

Rike

[11] Patent Number: 5,826,686
[45] Date of Patent: Oct. 27, 1998

[54] PISTON WITH MOISTURE-PROTECTIVE OUTER COVER FOR USE IN DISC BRAKE ASSEMBLY

[75] Inventor: Russell E. Rike, Spring Valley, Ohio

[73] Assignee: Dayton Walther Corporation, Dayton, Ohio

[21] Appl. No.: 834,587

[22] Filed: Apr. 7, 1997

Related U.S. Application Data

[63] Continuation of Ser. No. 575,411, Dec. 20, 1995, abandoned.

[51] Int. Cl.$^6$ ..................................................... F16D 65/38
[52] U.S. Cl. ..................................... 188/264 G; 188/73.1; 92/248
[58] Field of Search ................................. 188/72.4, 73.1, 188/73.37, 264 G, 370; 92/248

[56] References Cited

U.S. PATENT DOCUMENTS

| | | | |
|---|---|---|---|
| 4,170,926 | 10/1979 | Emmett | 92/212 |
| 4,248,329 | 2/1981 | Torigoe | 188/72.4 |
| 4,306,489 | 12/1981 | Driver et al. | 92/212 |
| 4,401,012 | 8/1983 | Emmett | 92/248 |
| 4,449,447 | 5/1984 | Yanagi | 92/248 |
| 4,513,844 | 4/1985 | Hoffman, Jr. | 188/71.6 |
| 4,537,289 | 8/1985 | VonGrunberg et al. | 188/72.4 |
| 4,581,985 | 4/1986 | Villata | 92/248 |
| 4,649,806 | 3/1987 | Hartsock | 92/212 |
| 4,875,556 | 10/1989 | Shaw et al. | 188/370 |
| 4,928,579 | 5/1990 | Emmett | 92/248 |
| 4,977,987 | 12/1990 | Schmidt et al. | 188/264 G |
| 5,484,041 | 1/1996 | Cadaret et al. | 188/73.37 |

FOREIGN PATENT DOCUMENTS

| | | |
|---|---|---|
| 1228963 | 11/1987 | Canada . |
| 2134-940 | 9/1978 | Germany . |
| 4328836-A1 | 3/1995 | Germany . |
| 57-18857 | 1/1982 | Japan . |
| 1114446 | 5/1968 | United Kingdom ............... F16J 1/02 |
| 2 165 902 A | 4/1986 | United Kingdom . |

OTHER PUBLICATIONS

Drawing No. DM–52–HW–4149, dated Dec. 13 1989.
Drawing No. "Insert DM–52", dated Dec. 13 1989.

Primary Examiner—Robert J. Oberleitner
Assistant Examiner—Chris Schwartz
Attorney, Agent, or Firm—MacMillan, Sobanski & Todd

[57] ABSTRACT

A piston for use in a disc brake assembly includes: a hollow plastic body defining an axis and including an open end and a closed end, the body defining an inner surface and an outer surface extending axially between the open end and the closed end; and a first steel cover integrally molded about portions of the outer surface and the closed end of the body, the first cover including an outer side wall and an end wall, the outer side wall of the first cover extending axially inwardly toward the open end along a portion of the outer surface of the body, and the end wall of the first cover extending radially inwardly along a portion of the closed end of the body. The piston preferably includes a generally annular second steel cover integrally molded about the open end of the body, the second cover including an end wall, an inner side wall, and an outer side wall, the end wall of the second cover extending about the open end of the body, and the inner and outer side walls of the second cover extending axially inwardly toward the closed end along a portion of the inner and outer surfaces of the body, wherein the first cover is spaced apart from the second cover.

12 Claims, 5 Drawing Sheets

PISTON WITH MOISTURE-PROTECTIVE OUTER COVER FOR USE IN DISC BRAKE ASSEMBLY

CROSS REFERENCES TO RELATED APPLICATIONS

This application is a continuation of U.S. Pat. Ser. No. 08/575,411, filed Dec. 20, 1995, now abandoned.

BACKGROUND OF THE INVENTION

This invention relates in general to vehicle disc brake assemblies and in particular to an improved structure for a piston adapted for use in such a vehicle disc brake assembly.

Most vehicles are equipped with a brake system for retarding or stopping movement of the vehicle in a controlled manner. A typical brake system for an automobile and a light duty truck includes a disc brake assembly for the front wheels of the vehicle, and either a disc brake assembly or a drum brake assembly for the rear wheels of the vehicle. A typical brake system for a medium duty truck includes a disc brake assembly on all four wheels of the vehicle. The brake assemblies are usually actuated by hydraulic or pneumatic pressure generated when an operator of the vehicle depresses a brake pedal. The structures of the disc brake assembly, as well as the actuators therefore, are well known in the art.

There are two basic types of calipers for use in disc brake assemblies. namely, a "floating" caliper disc brake assembly, and a "fixed" caliper disc brake assembly. A floating caliper disc brake assembly is usually used on automobiles and light and medium duty trucks. A conventional floating caliper disc brake assembly includes a brake caliper which is supported by a pair of pins for sliding movement relative to an anchor plate which is secured to a fixed, non-rotatable component of the vehicle. A fixed caliper disc brake assembly is sometimes used on automobiles and light and medium duty trucks. A conventional fixed caliper disc brake assembly includes a brake caliper which is secured to a fixed, non-rotatable component of the vehicle.

In both types of disc brake assemblies, a pair of brake shoes are supported by the disc brake assembly for sliding movement relative thereto. The brake shoes have respective friction pads which are disposed on opposite sides of a rotor. The rotor, in turn, is connected to the wheel of the vehicle for rotation therewith. To effect braking action, the brake shoes are moved inwardly toward one another so as to frictionally engage the opposed sides of the rotor. Such frictional engagement causes retarding or stopping of the rotational movement of the rotor and, therefore, the wheel of the vehicle in a controlled manner.

To accomplish this in a fixed caliper disc brake assembly, the brake caliper assembly includes an inboard caliper assembly disposed adjacent to an inboard brake shoe, and an outboard caliper assembly disposed adjacent to an outboard brake shoe. One or more hydraulically or pneumatically actuated pistons are provided in respective cylindrical recesses formed in the inboard caliper assembly adjacent to the inboard brake shoe, and one or more hydraulically or pneumatically actuated pistons are provided in respective cylindrical recesses formed in the outboard caliper assembly adjacent to the outboard brake shoe. This type of construction is commonly referred to as an "opposed" piston caliper design. When the brake pedal is depressed, the pistons urge the brake shoes toward one another and into engagement with the associated side of the rotor. As a result, the brake shoes frictionally engage the opposed sides of the rotor.

Hydraulic fluid and sometimes other moisture present in the disc brake assembly comes into contact with the body of the piston. The piston can be constructed from a metallic material which does not absorb moisture, but unfortunately a metallic disc brake piston is relatively expensive. It is less expensive to manufacture a disc brake piston from a plastic material than from a metallic material. However, it has been found that a disc brake piston formed from a plastic material tends to absorb moisture, and that this moisture absorption can cause dimensional instability and swelling of the body of the piston. Thus, it would be desirable to provide an improved structure for a piston which avoids moisture absorption and which is relatively inexpensive to manufacture.

SUMMARY OF THE INVENTION

This invention relates to an improved structure for a piston adapted for use in a vehicle disc brake assembly. The piston includes a generally hollow cylindrical body having an open end and a closed end. The body is formed from a plastic material and includes inner and outer cylindrical surfaces which extend axially between the open end and the closed end. A generally cylindrical first steel cover is integrally molded about portions of the outer cylindrical surface and the closed end of the body of the piston. The first cover forms a seal to protect the outer cylindrical surface of the plastic body from surrounding moisture. It thereby prevents dimensional instability and swelling of the body. Preferably the piston also includes a generally annular second steel cover which is integrally molded about the open end of the body of the piston. The second cover extends over the annular end surface of the open end of the body and axially toward the closed end along portions of both the inner and outer cylindrical surfaces. The second cover protectively shields the enclosed portions of the plastic body from heat which is generated between the rotor and the brake shoes during braking. The first cover is spaced apart from the second cover so that there is a discontinuity in the metal which acts as a heat flow barrier between the two covers.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
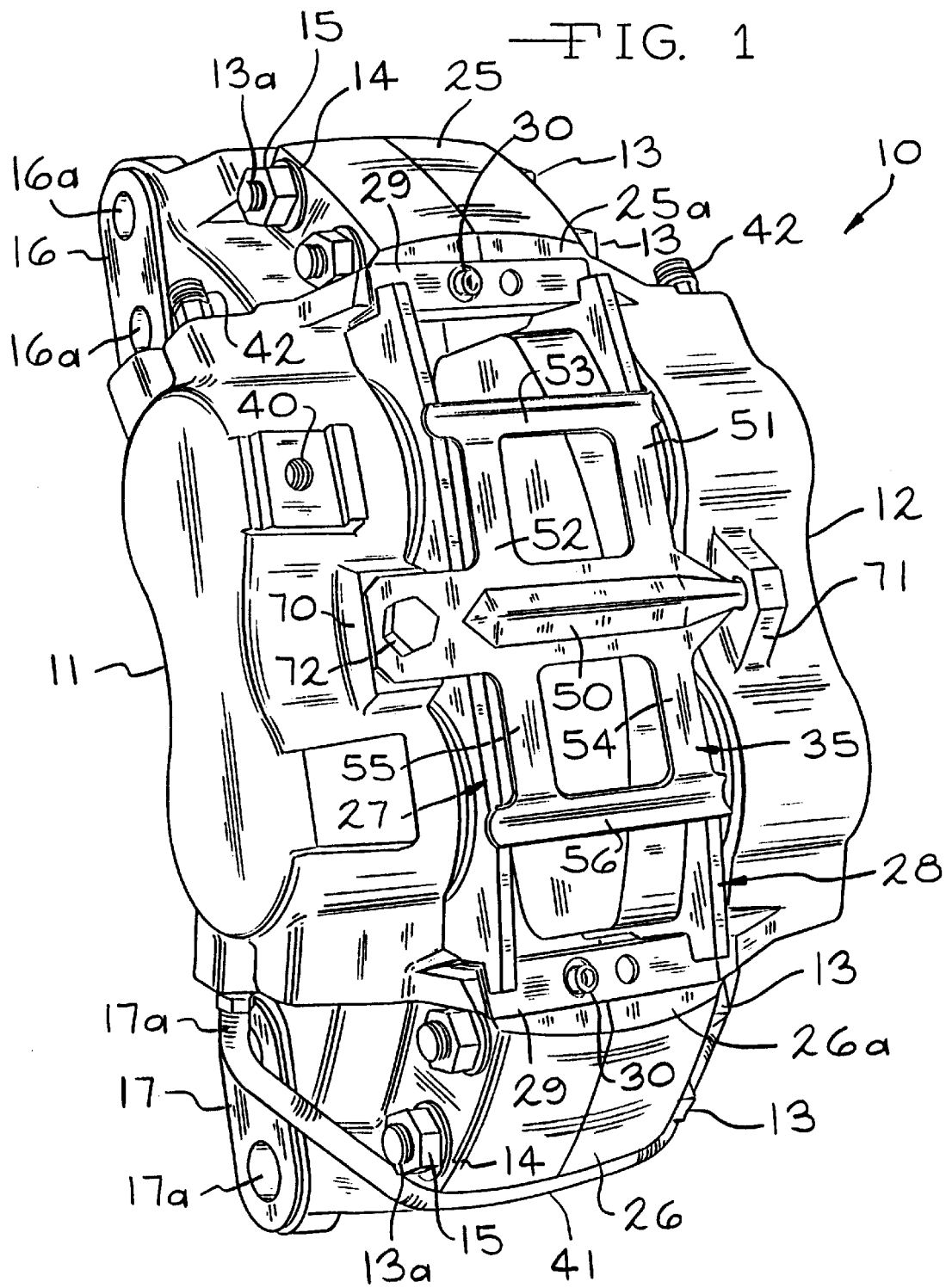
FIG. 1 is a perspective view of a portion of a vehicle disc brake assembly adapted to include an improved disc brake piston in accordance with this invention.
Figure 2:
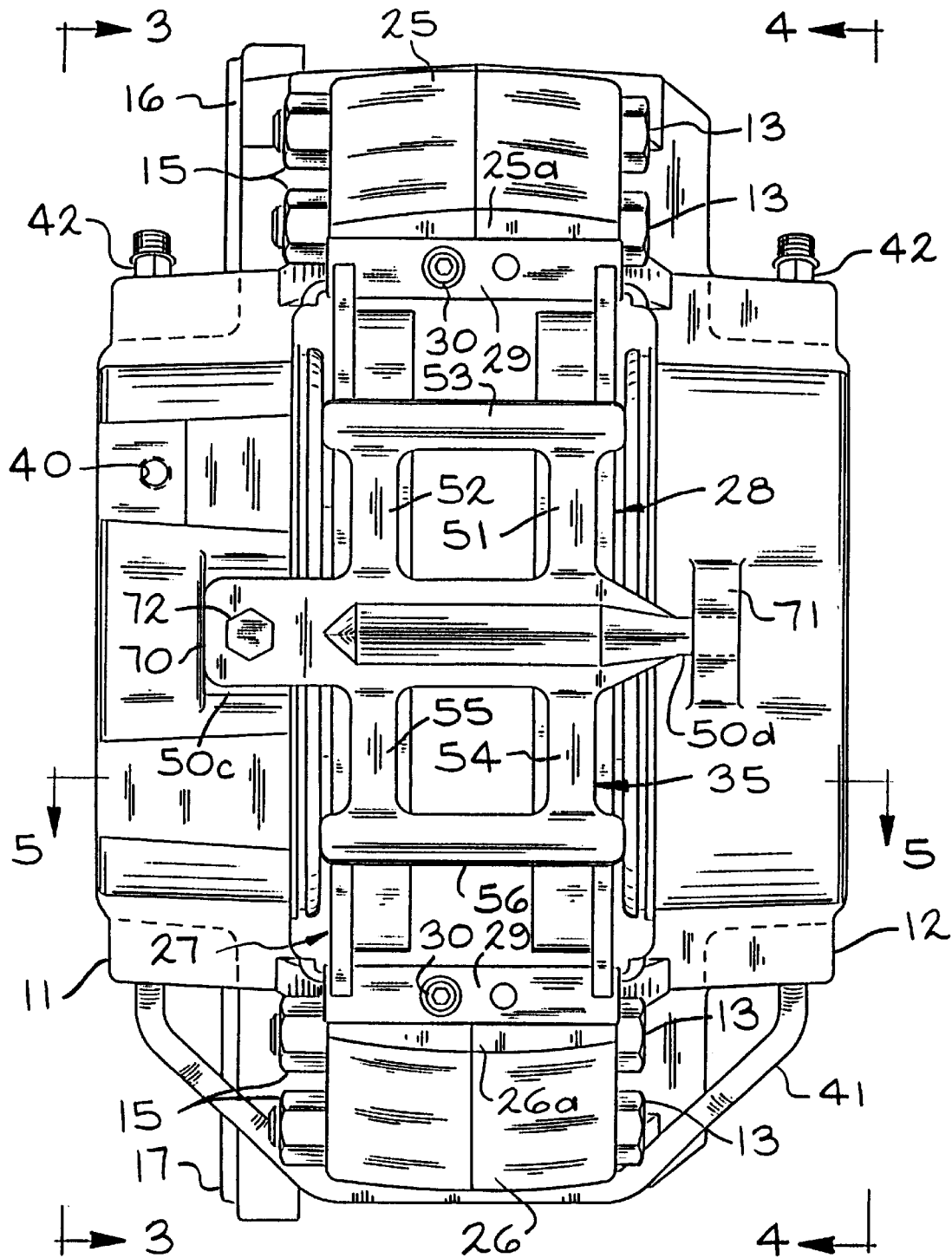
FIG. 2 is a top plan view of the disc brake assembly illustrated in FIG. 1.

Referring now to the drawings, there is illustrated in FIGS. 1 and 2 a vehicle disc brake assembly, indicated generally at 10, and constructed in accordance with the present invention. The general structure and operation of the disc brake assembly 10 is conventional in the art. Thus, only those portions of the disc brake assembly 10 which are necessary for a full understanding of this invention will be explained and illustrated.

Figure 3:
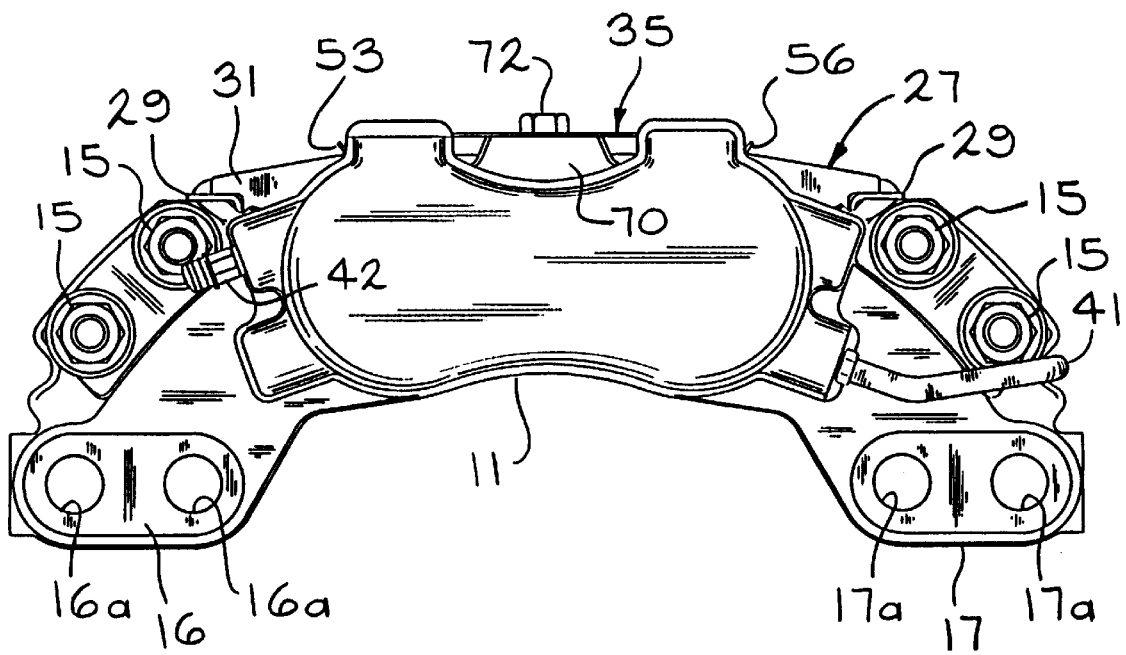
FIG. 3 is an elevational view of the disc brake assembly taken along line 3—3 of FIG. 2.
Figure 4:
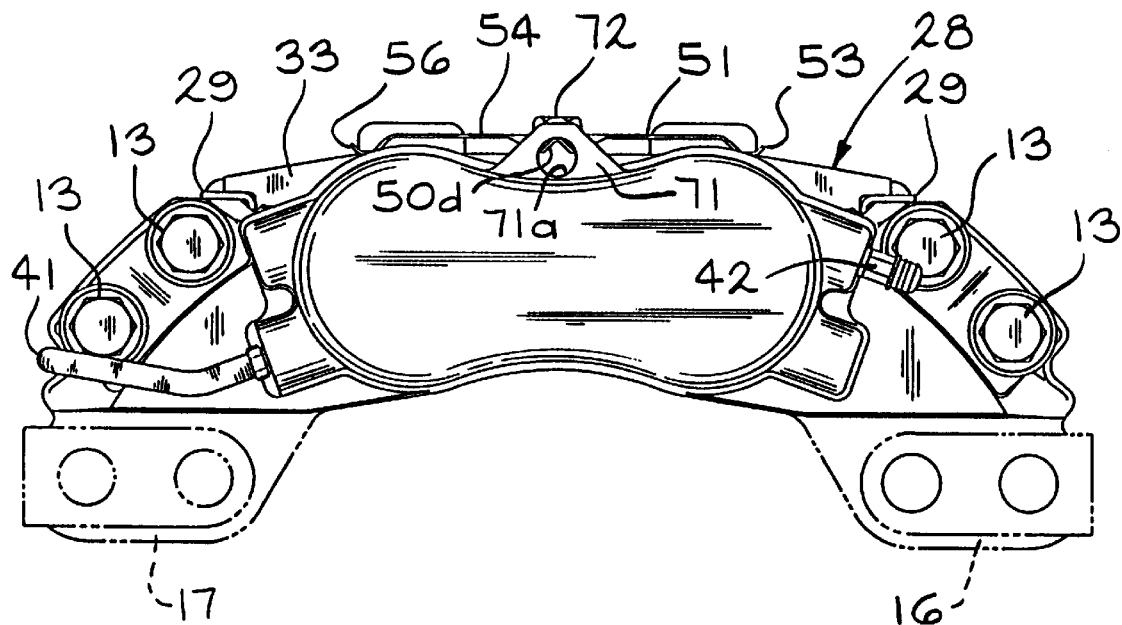
FIG. 4 is an elevational view of the disc brake assembly taken along line 4—4 of FIG. 2.

The illustrated disc brake assembly is an opposed four piston fixed caliper disc brake assembly, and is associated with a right wheel of a vehicle. The disc brake assembly 10 is a two-piece construction, and includes an inboard brake caliper assembly 11, best shown in FIG. 3, and an outboard brake caliper assembly 12, best shown in FIG. 4. The constructions of the inboard caliper assembly 11 and the outboard caliper assembly 12 are generally similar to one another, and like reference numbers will be used for corresponding parts.

The inboard brake caliper assembly 11 and the outboard brake caliper assembly 12 are provided with respective pairs of aligned apertures formed therethrough. Threaded bolts 13 extend through the respective pairs of apertures, and washers 14 and nuts 15 are installed on threaded ends 13a of the bolts 13 to secure the inboard caliper assembly 11 to the outboard caliper assembly 12. Alternatively, the inboard caliper assembly 11 and the outboard caliper assembly 12 may be integrally formed.

The inboard caliper assembly 11 includes a pair of anchoring arms 16 and 17 provided at opposed ends thereof Each of the arms 16 and 17 are provided with a pair of apertures 16a and 17a, respectively, formed therethrough. The apertures 16a and 17a are adapted to receive bolts (not shown) for securing the inboard caliper assembly 11, and therefore the assembled disc brake assembly 10, to a fixed, non-rotatable component of the vehicle. Such fixed component can be, for example, an axle flange when the disc brake assembly is installed for use on the rear of the vehicle, or a steering knuckle when the disc brake assembly is installed for use on the front of the vehicle.

Figure 5:
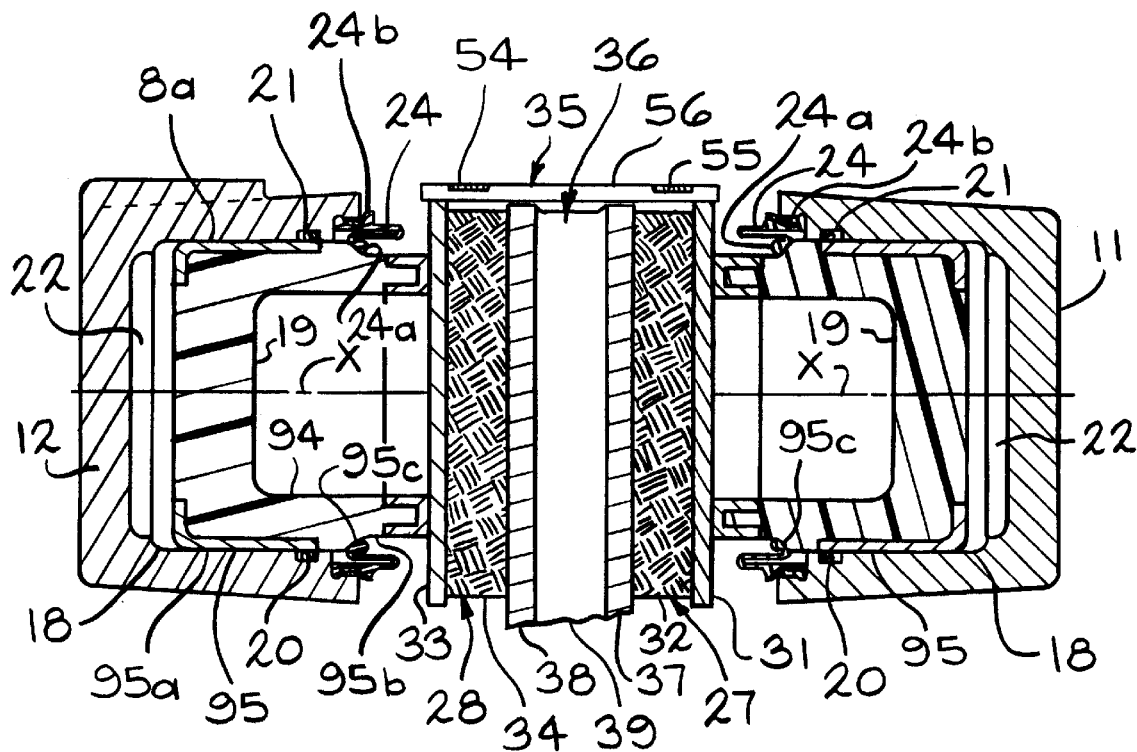
FIG. 5 is a cross-sectional view of the disc brake assembly taken along line 5—5 of FIG. 2, including a view of the disc brake piston.

Referring now to FIG. 5, the inboard caliper assembly 11 includes a pair of cylindrical recesses 18 formed therein, one of which is shown. Similarly, the outboard caliper assembly 12 includes a pair of cylindrical recesses 18 formed therein, one of which is shown. A piston 19 is disposed in each of the cylindrical recesses 18 of the inboard caliper assembly 11 and the outboard caliper assembly 12. A fluid seal 20 is disposed in an annular groove 21 formed in a side wall 18a of the cylindrical recess 18. The fluid seal 20 engages an outer cylindrical surface 95 of the piston 19. The fluid seal 20 is provided to define a sealed hydraulic fluid chamber 22, within which the piston 19 is disposed for sliding movement.

In particular, the inboard caliper assembly 11 includes a pair of hydraulic fluid chambers 22 which are connected together by a fluid passageway (not shown) formed therein. Similarly, the outboard caliper assembly 12 includes a pair of hydraulic fluid chambers 22 which are connected together by a fluid passageway (not shown) formed therein. Also, the fluid seal 20 is designed to function as a roll-back seal which retracts the piston 19 within the cylindrical recess 18 when the disc brake assembly 10 is not actuated. Thus, it will be appreciated that the illustrated brake actuating means is a hydraulic actuating means. However, other well known types of actuating means, such as pneumatic, electrical, and mechanical, can also be used.

A dust boot seal 24 is provided about the outboard end of the piston 19 to prevent water, dirt, and other contaminants from entering into the cylindrical recess 18. The dust boot seal 24 is formed from a flexible material and has a first end 24a which engages a shoulder 95c of the piston 19 and a second end 24b which engages an annular recess formed adjacent the open ends of the associated cylindrical recesses 18. A plurality of flexible convolutions are provided in each dust boot seal 24 between the first and second ends thereof to accommodate movement of the pistons 19 within each of the respective cylindrical recesses 18.

Referring to FIGS. 1 through 5, the disc brake assembly 10 includes a pair of arms 25 and 26 having respective guide rails 25a and 26a formed thereon. The guide rails 25a and 26a extend transverse to the arms 25 and 26, and extend parallel to one another. As will be discussed, a pair of brake shoes 27 and 28 are supported on the guide rails 25a and 26a for sliding movement relative thereto. Preferably, a hardened replaceable insert 29 is secured to each of the guide rails 25a and 26a by a fastener 30. The inserts 29 are preferably formed from stainless steel, and provide a smooth, corrosion resistant sliding surface for the brake shoes 27 and 28.

As best shown in FIG. 5, the inboard brake shoe 27 includes a backing plate 31 having a friction pad 32 secured thereto. Similarly, the outboard brake shoe 28 includes a backing plate 33 having a friction pad 34 secured thereto.

In the illustrated embodiment, a brake shoe hold down clip 35 is releasably attached to the disc brake assembly 10 to bias the upper ends of the backing plates 31 and 33 of brake shoes 27 and 28 against the guide rails 25a and 26a. The hold down clip 35 is generally arcuate in shape, and is formed having a longitudinally extending central mounting portion 50. A first pair of opposed spaced apart arms 51 and 52 extend transverse to and outwardly from one side of the central mounting portion 50. The ends of the first pair of arms 51 and 52 terminate at and are interconnected by a generally U-shaped first end arm 53 which extends generally parallel to the central mounting portion 50.

The hold down clip 35 further includes a second pair of spaced apart arms 54 and 55 which extend transverse to and outwardly from the opposite side of the central mounting portion 50. The ends of the second pair of arms 54 and 55 terminate at and are interconnected by a generally U-shaped second end arm 56 which extends generally parallel to the central mounting portion 50.

The central mounting portion 50 further includes an aperture formed adjacent one end 50c thereof. A raised, generally inverted V-shaped strengthening rib 61 extends substantially the entire length of the central mounting portion 50 and terminates at an opposite end 50d. The end 50d of the hold down clip 35 is disposed in an opening formed in a raised mounting pad 71 provided on the outboard caliper assembly 12. A bolt 72 having a threaded end extends through the aperture in the hold down clip 35 and is threadably received in a threaded aperture formed in a raised mounting pad 70 provided on the inboard caliper assembly 11.

As shown in FIG. 5, the brake shoes 27 and 28 are disposed on opposite sides of a rotor 36. The rotor 36 is generally flat and circular in shape and is secured in a conventional manner to a rotatable wheel (not shown) of the vehicle. The illustrated rotor 36 includes a pair of opposed braking discs 37 and 38 which are spaced apart from one another by a plurality of intermediate vanes 39 in a known manner.

When it is desired to actuate the disc brake assembly 10 to retard or stop the rotation of the brake rotor 36 and the vehicle wheel associated therewith, the driver of the vehicle depresses the brake pedal (not shown). In a manner which is well known in the art, the depression of the brake pedal causes pressurized hydraulic fluid to be introduced into the disc brake assembly 10 via a threaded inlet port 40 provided in the inboard caliper assembly 11. The inlet port 40 is connected through a brake line (not shown) to a master cylinder (not shown) of the vehicle brake system. The brake line is attached to the inlet port 40 by a threaded fitting (not shown). The hydraulic fluid flows from the inlet port 40 into the inboard hydraulic fluid chambers 22 to urge the associated pistons 19 in the inboard caliper assembly 11 in the outboard direction (toward the left when viewing FIG. 5) into engagement with the backing plate 31 of the inboard brake shoe 27.

The hydraulic fluid chambers 22 of the inboard caliper assembly 11 are connected to the hydraulic fluid chambers 22 of the outboard caliper 12 by a fluid supply assembly 41. Thus, at the same time, the hydraulic fluid flows through the fluid supply assembly 41 into the outboard hydraulic fluid chambers 22 to urge the associated pistons 19 in the outboard caliper assembly 12 in the inboard direction (toward the right when viewing FIG. 5) into engagement with the backing plate 33 of the outboard brake shoe 28. As a result, the friction pad 32 of the inboard brake shoe 27 is moved into frictional engagement with the inboard braking disc 37 of the rotor 36, and the friction pad 34 of the outboard brake shoe 28 is simultaneously moved into frictional engagement with the outboard braking disc 38 of the rotor 36. As a result, the rotor 36 is frictionally engaged by the friction pads 32 and 34 to retard relative rotational movement thereof.

The disc brake assembly 10 further includes a pair of bleeder screws 42 which are received in a threaded aperture provided in each of the inboard caliper assembly 11 and the outboard caliper assembly 12. The bleeder screws 42 are provided to bleed air from the associated hydraulic fluid chambers 22 when the disc brake assembly 10 is initially connected to the vehicle hydraulic brake system.

Figure 6:
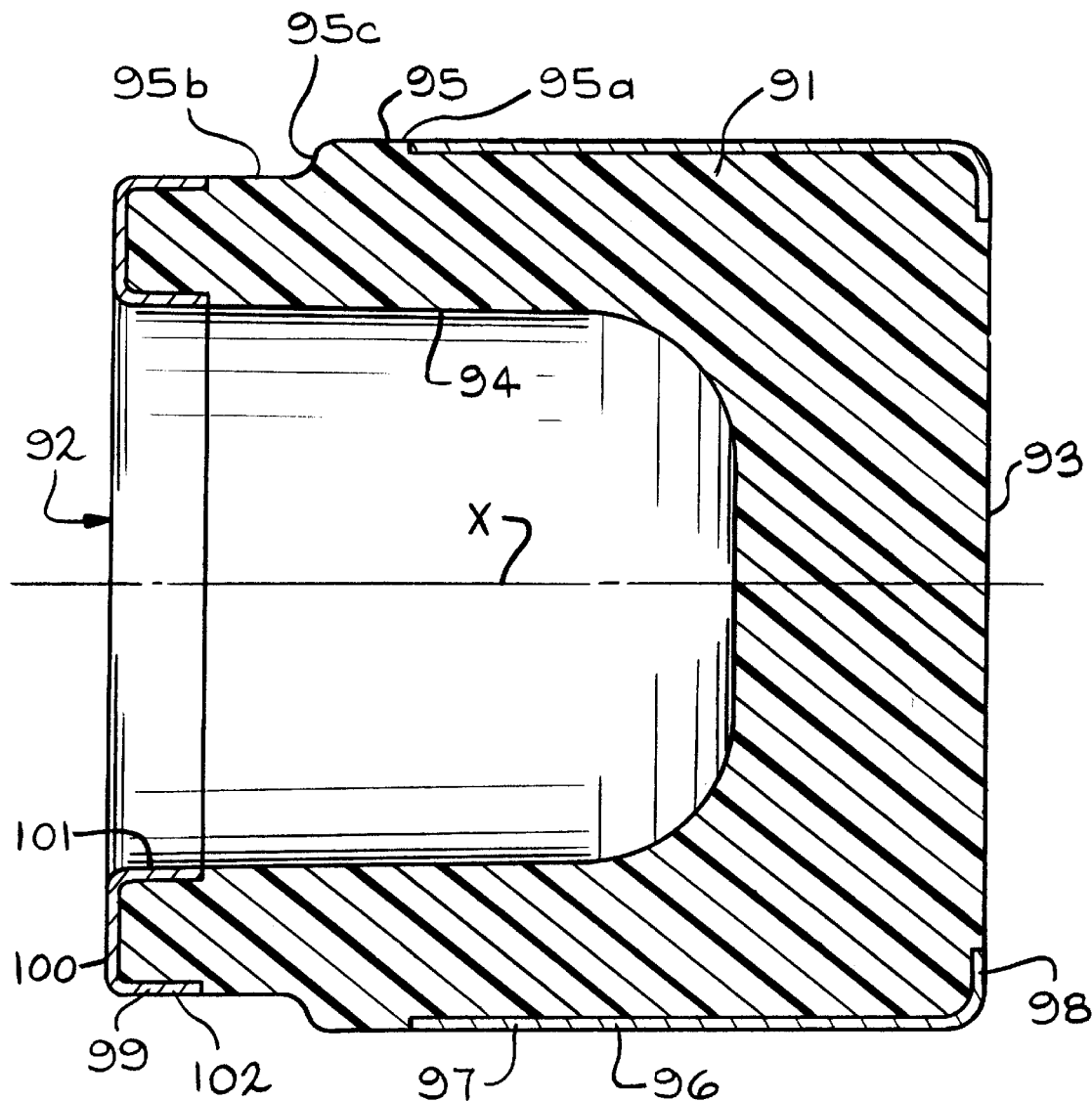
FIG. 6 is a cross-sectional view of the disc brake piston of FIG. 5.

Referring now to FIGS. 5 and 6, the structure of a piston 19 in accordance with this invention is illustrated in detail. As shown therein, the piston 19 includes a body 91 which is preferably molded from a plastic, and more preferably from a synthetic resin material such as a phenolic resin. The body 91 of the piston 19 is generally hollow and cylindrical in shape, having an open end 92 and a closed end 93. An inner cylindrical surface 94 and an outer cylindrical surface 95 extend axially between the open end 92 and the closed end 93. The inner cylindrical surface 94 and the outer cylindrical surface 95 of the body 91 are preferably concentric with a longitudinal axis X of the piston 19. Preferably the body 91 of the piston 19 is narrowed at its open end 92, but this is not critical to the invention. Specifically, the outer cylindrical surface 95 of the body of the piston includes a first outer surface 95*a* and a reduced diameter second outer surface 95*b*. The first and second outer surfaces 95*a* and 95*b* extend parallel to and concentric with the longitudinal axis. The transition between the first and second outer surfaces 95*a* and 95*b* defines a shoulder 95*c*. The shoulder 95*c* is adapted to receive the first end 24*a* of the dust boot seal 24.

The outer cylindrical surface 95 of the body 91 of the piston 19 is not resistant to moisture, because this surface is ground after molding to achieve a precise tolerance. In contrast, the closed end 93 of the body 91 of the piston 19 is an as-molded surface (it is not ground after molding), and therefore it is resin-rich and resistant to moisture.

A generally cylindrical first cover 96 is integrally molded about portions of the outer cylindrical surface 95 and the closed end 93 of the body 91 of the piston 19. The first cover 96 includes an outer cylindrical side wall 97 and an end wall 98. The outer cylindrical side wall 97 of the first cover 96 extends axially inwardly toward the open end 92 of the body along a portion of the outer cylindrical surface 95 of the body. The end wall 98 of the first cover 96 extends radially inwardly along a portion of the closed end 93 of the body. Thus, the outer cylindrical side wall 97 and the end wall 98 extend generally perpendicular to one another. Preferably the outer cylindrical side wall 97 of the first cover 96 extends over about 60% to about 80% of the outer cylindrical surface 95 of the body 91 of the piston 19. However, the outer cylindrical side wall 97 of the first cover 96 does not extend all the way to the open end 92 of the body 91 of the piston 19, in order to avoid heat transfer into the first cover (discussed hereinbelow). If a piston having a radial groove were used, the outer cylindrical side wall 97 of the first cover 96 would typically extend just short of the groove.

As mentioned above, the outer cylindrical surface 95 of the body 91 of the piston 19 is not resistant to moisture which can be picked up from the disc brake assembly. Thus, the outer cylindrical side wall 97 of the first cover 96 extends over this surface of the piston to protect against moisture absorption. Protecting the outer cylindrical surface of the body of the piston from moisture absorption protects the body's structural integrity and dimensional stability, and it also prevents the body from swelling. Preferably, the outer cylindrical side wall 97 of the first cover 96 extends over that portion of the outer cylindrical surface 95 that comes into contact with the fluid seal 20. This further protects the outer cylindrical surface 95 from moisture.

The first cover 96 also extends over a portion of the closed end 93 of the body 91 of the piston 19. Extending the first cover in this manner creates an excellent moisture seal between the first cover and the body of the piston so that moisture cannot leak under the first cover around the edges. This structure also creates smooth edges around the closed end 93 of the body 91 of the piston 19 so that the dust boot seal 24 is not damaged during assembly of the disc brake. The first cover 96 can extend further over the closed end 93 of the body of the piston if desired, but it is not necessary.

Preferably, a generally annular second cover 99 is integrally molded about the open end 92 of the body 91 of the piston 19. The second cover 99 includes an end wall 100, an inner cylindrical side wall 101, and an outer cylindrical side wall 102. The end wall 100 extends about the open end 92 of the body 91. The inner and outer side walls 101 and 102 extend axially inwardly toward the closed end 93 along portions of the inner and outer cylindrical surfaces 94 and 95 of the body 91. Thus, the second cover 99 has a generally U-shaped cross section. The end wall 100 defines an annular abutment surface which is oriented perpendicular to the longitudinal axis X of the piston 19. The abutment surface 100 is adapted to engage the inboard backing plate 31 of the inboard brake shoe 27, so that during braking the abutment surface urges the brake shoe against the rotor. This second cover 99 protectively shields the enclosed portions of the plastic body 91 from heat which is generated between the rotor and the brake shoes during braking.

The covers are formed from materials which are different from the material of the piston. They are preferably formed from a metallic material such as steel or aluminum. More preferably they are formed from steel which is stainless steel or carbon steel, and can be electroplated with zinc for corrosion protection.

The metallic covers are good thermal conductors compared to the plastic body of the piston. Accordingly, it is important that the first cover 96 is spaced apart from the second cover 99 so that there is a discontinuity between the covers. This discontinuity acts as a barrier against heat flow from the second cover 99 into the first cover 96 during a braking operation, it thereby helps to prevent heat transfer to the hydraulic brake fluid and/or heat damage to the fluid seal 20 or to the surface of the piston.

Standard molding procedures are sufficient to hold the covers to the body of the piston, but if desired additional treatments or means could be used for this purpose. For example, a metal spray could be used to form an adhesive bond between the covers and the body, or the inside of the covers could be coated to produce a rough surface for better adhesion. Projections from the covers into the body could also be used.

It will be appreciated that while the present invention has been described and illustrated in conjunction with the particular vehicle disc brake assembly disclosed herein, the invention may be used in conjunction with other disc brake assemblies. For example, the invention may be used in conjunction with a sliding caliper type of disc brake assembly.

Also, it will be appreciated that other piston structures can be used in conjunction with the present invention. For example, the inner cylindrical surface 94 and the outer cylindrical surface 95 of the piston 19 may extend uninterrupted from the closed end 93 to the open end 92 thereof In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A piston adapted for use in a brake assembly comprising:
    a hollow body defining an axis and including an open end and a closed end, the body defining an inner surface and an outer surface extending axially between the open end and the closed end, the body being formed from a first material;
    a first cover formed from a second material and integrally molded about portions of the outer surface and the closed end of the body, the first cover including an outer side wall and an end wall, the outer side wall of the first cover extending axially inwardly toward the open end along a portion of the outer surface of the body, and the end wall of the first cover extending radially inwardly along not more than a portion of the closed end of the body; and
    a generally annular second cover formed from the second material and positioned about the open end of the body, the second cover including an end wall, an inner side wall, and an outer side wall, the end wall of the second cover extending about the open end of the body, and the inner and outer side walls of the second cover extending axially inwardly toward the closed end along a portion of the inner and outer surfaces of the body, wherein the first cover is spaced apart from the second cover.

2. The piston defined in claim 1 wherein the body of the piston and the first cover are generally cylindrical in shape.

3. The piston defined in claim 1 wherein the piston is formed from a synthetic resin material.

4. The piston defined in claim 1 wherein the first cover is formed from steel.

5. The piston defined in claim 1 wherein the outer cylindrical side wall of the first cover is adapted to continuously contact a fluid seal of the brake assembly.

6. A disc brake caliper assembly comprising:
    a caliper including an inboard leg and an outboard leg, the inboard leg including a recess formed therein;
    a piston slidably disposed in the recess, the piston including a hollow body defining an axis and including an open end and a closed end, the body defining an inner surface and an outer surface extending axially between the open end and the closed end, the body being formed from a first material;
    a first cover formed from a second material and integrally molded about portions of the outer surface and the closed end of the body, the first cover including an outer side wall and an end wall, the outer side wall of the first cover extending axially inwardly toward the open end along a portion of the outer surface of the body, and the end wall of the first cover extending radially inwardly along not more than a portion of the closed end of the body; and
    a generally annular second cover formed from the second material and positioned about the open end of the body, the second cover including an end wall, an inner side wall, and an outer side wall, the end wall of the second cover extending about the open end of the body, and the inner and outer side walls of the second cover extending axially inwardly toward the closed end along a portion of the inner and outer surfaces of the body, wherein the first cover is spaced apart from the second cover.

7. The disc brake caliper assembly defined in claim 6 and further including a pair of friction pads carried by the caliper and disposed on opposite axial sides of an associated rotor.

8. The disc brake caliper assembly defined in claim 7 and further including actuation means carried by the caliper for selectively moving the friction pads into frictional engagement with the rotor.

9. The disc brake caliper assembly defined in claim 6 wherein the body of the piston and the first cover are generally cylindrical in shape.

10. The disc brake caliper assembly defined in claim 6 wherein the piston is formed from a synthetic resin material.

11. The disc brake caliper assembly defined in claim 6 wherein the first cover is formed from steel.

12. The disc brake caliper assembly defined in claim 6 wherein the outer cylindrical side wall of the first cover is adapted to continuously contact a fluid seal of the brake assembly.

* * * * *